United States Patent [19]

Sayko

[11] Patent Number: 4,484,202

[45] Date of Patent: Nov. 20, 1984

[54] COILED CONDUITS WITHIN INK JET RESERVOIR

[75] Inventor: Steven P. Sayko, Dryden, N.Y.

[73] Assignee: NCR Corporation, Dayton, Ohio

[21] Appl. No.: 417,277

[22] Filed: Sep. 13, 1982

[51] Int. Cl.³ .............................................. G01D 15/18

[52] U.S. Cl. ............................ 346/140 R; 346/140 A

[58] Field of Search .................. 346/75, 140 R, 140 IJ

[56] References Cited

U.S. PATENT DOCUMENTS 4,025,928 5/1977 Hou et al. ........................ 346/140 A 4,272,773 6/1981 Halasz ............................. 346/140 R 4,418,353 11/1983 Thomas ........................... 346/140 R

*Primary Examiner*—E. A. Goldberg

*Assistant Examiner*—Gerald E. Preston

*Attorney, Agent, or Firm*—J. T. Cavender; Wilbert Hawk, Jr.; George J. Muckenthaler

[57] ABSTRACT

A movable ink reservoir carries a plurality of ink jet printing elements and supplies ink to the elements by means of individual conduits. The individual conduits are coils of tubing arranged in stacked side-by-side manner and the reservoir includes a portion for containing the tubing in such coiled arrangement.

18 Claims, 2 Drawing Figures

COILED CONDUITS WITHIN INK JET RESERVOIR

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both accurate and high speed printing.

In the matter of ink jet printing, it is extremely important that the control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high speed operation for ejecting the ink through the nozzle while allowing time between droplets for proper operation. The ink nozzle construction just be of a nature to permit fast and clean ejection of ink droplets from the print head.

In the ink jet printer, the print head structure may be a multiple nozzle type, with the nozzles aligned in a vertical line and supported on a print head carriage which is caused to be moved or driven in a horizontal direction for printing in line manner, while the ink droplet drive elements or transducers may be positioned in a circular configuration with passageways leading to the nozzles.

Alternatively, the printer structure may include a plurality of equally-spaced, horizontally aligned, single nozzle print heads which are caused to be moved in back and forth manner to print successive lines of dots in making up the lines of characters. In this latter arrangement, the drive elements or transducers are individually supported along a line of printing.

In a still different structure, the nozzles are spaced in both horizontal and vertical directions and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual ink jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper and to actuate each individual nozzle separately when the nozzle is properly located to lay down a dot in the desired position. A vertical row of dots is created by sequentially actuating the nozzles rather than simultaneous actuation thereof, the latter being the preferred practice in the more common nozzle arrangements.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-acting valve or like device to control the flow of ink to a single ink jet printing nozzle is known in specific applications, but in certain cases the concept and structure has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold.

After the droplets of ink have been ejected from the nozzles, the ink is replenished thereat from a remote supply by the capillary action of the meniscus at the end of the nozzle. In certain control devices and arrangements for ink jet printers, it has been found that some difficulties arise from the capillary action refill or replenish process and there are adverse effects on the performance and reliability of such printers.

In normal operation of an ink jet print head, it is known in the art that a negative meniscus of ink should be maintained at the nozzle, that the relative levels of ink in the various parts or areas of the system have an effect on the printing operation, and further, that the movement of the several printer elements affects the flow of ink during the printing cycle.

An additional observation in the operation of an ink jet printer of the drop-on-demand type is that each time a drop of ink is ejected from the nozzle, a pressure wave or surge originates thereat and travels back toward the reservoir of ink. Such pressure wave then may return toward the nozzle in a reflected manner of action and movement and thus cause faulty performance in the printing operation. It is of concern in the operation that such pressure waves are controlled in a manner so as not to affect the printing, or at least to minimize the effect of any such wave motion thereon. It is also important to consider the arrangement of the several parts or elements of a printer when dealing with pressure changes associated with or caused by wave motion in the ink.

In the concept of dot matrix printing, it is generally desired to place the print element actuators in a position to allow characters to be printed in serial manner and this placement requires that the print wires, nozzles, electrodes or other like print actuators be very closely spaced with respect to each other. Since the print actuators are generally larger in size than the diameter of the printed dot, a relatively long wire, channel or like element must be provided to bring the desired print activity from its source, such as a moving armature or plunger or a pressure generating piezoelectric crystal or the like, to a vertical, closely-spaced column arranged in a pattern such that a column of closely-spaced tangentially coincident or overlapping dots will be produced on the record media if all actuators are fired or actuated at one time. However, it is likely seen that the use of long wires or fluid channels are known to lower the performance of the actuators.

Since it is desirable to eliminate the long curving transition section between the drive elements and the nozzles, as in the case of the circular arrangement of drive elements mentioned above, it is proposed to provide an array of ink jet transducers in a spaced configuration or manner for use in a compact print head.

Representative documentation in the field of ink control means for ink jet printers includes U.S. Pat. No. 3,832,579, issued to J. P. Arndt on Aug. 27, 1974, which discloses energy-absorbing means coupled to the liquid for absorbing pressure waves therein. Such means include conduit walls of viscoelastic material which deform and absorb energy, and also several forms of acoustic resistance elements within the conduit at the inlet end.

U.S. Pat. No. 4,095,237, issued to J. R. Amberntsson on June 13, 1978, discloses an ink reservoir which follows the print head and has a filter in the flow path of the ink to provide capillary action to prevent passage of air from the reservoir to the head.

U.S. Pat. No. 4,354,197, issued to P. H. Reitberger on Oct. 12, 1982, discloses various means for damping pressure waves in the ink fluid and including a hose of soft wall material, a hose shaped to include an exponential section, and chambers formed within the ink supply line containing flow-inhibiting material.

U.S. Pat. No. 4,418,353, issued to J. E. Thomas on Nov. 29, 1983, discloses a short tapered elastomer tube that carries ink from a reservoir to an ink jet print head and which has a thin wall section for absorbing return pressure waves generated from the nozzle of the print head.

SUMMARY OF THE INVENTION

The present invention relates to ink jet printers and to an array of ink droplet drive elements or liquid droplet producing transducers arranged in a compact configuration. The drive elements include piezoelectric or like crystal elements which are pulsed or energized by connection means operably associated with and forming a part of the supporting structure. The drive elements also include a coaxial nozzle formed with an orifice to generate or create the ink droplets by the pulse-on-demand method. More particularly, the invention relates to means for damping or inhibiting the pressure waves that originate at the print head nozzle upon actuation of the print head and for minimizing the effect of such pressure waves on the printing operation. A supply tube of relatively flexible or elastomeric, vinyl material is disposed with one end thereof immersed in the ink reservoir and coiled therein and the other end connected to the print head. The ink reservoir is carried on a carriage movable in back-and-forth manner relative to paper or like record media and has at least a pair of print heads supported from and carried therewith in reciprocating manner during printing operation.

The apparatus and arrangement provides for controlling the pressure waves originating at the print head nozzle and the relatively flexible-wall coiled tube enables absorbing of the pressure waves. The coil of tubing for each ink jet drive element is directly and closely associated therewith and is contained in compact manner by the particular design and formation of the print head housing which performs the dual function of containing a supply of ink and maintaining the tubing in a coiled condition.

In view of the above discussion, the principal object of the present invention is to provide an ink jet print head for generating droplets of ink on demand.

Another object of the present invention is to provide an ink jet print head of compact design having a plurality of ink droplet-producing elements or devices.

An additional object of the present invention is to provide means for supporting a plurality of ink droplet producing elements in a compact symmetrical arrangement.

Still another object of the present invention is to provide means for controlling the flow of ink through supply lines to the respective ink jet elements.

Still another object of the present invention is to provide housing means for smoothing the flow of ink from a supply thereof to the ink jet nozzles.

Still an additional object of the present invention is to provide means for smoothly controlling the flow of ink through the ink jet elements during printing operation.

Still a further object of the present invention is to provide ink supply tubes having lengths of coil contained within the ink reservoir for absorbing back pressure waves of ink from the ink jet nozzles.

Still another object of the present invention is to provide means for controlling movement of ink in a reciprocating reservoir carrying a plurality of ink jet nozzles.

Still a further object of the present invention is to provide an ink reservoir which is directly connected with moving ink jet nozzles and having a plurality of coiled tubes contained in precise locations by formation of the reservoir housing and supplying ink to the several respective ink jet nozzles.

Still an additional object of the present invention is to provide an ink reservoir with ink supply tubes therein wherein the arrangement prevents diffusion of ink components through the tubing walls.

Still a further object of the present invention is to provide separate supply tubes within the ink reservoir for controlling the ink therein during acceleration and deceleration of the print head.

Additional advantages and features of the present invention will become apparent and fully understood from a reading of the following description taking together with the annexed drawing.

DESCRIPTION OF THE PREFERRED EMBODIMENT

Figure 1:
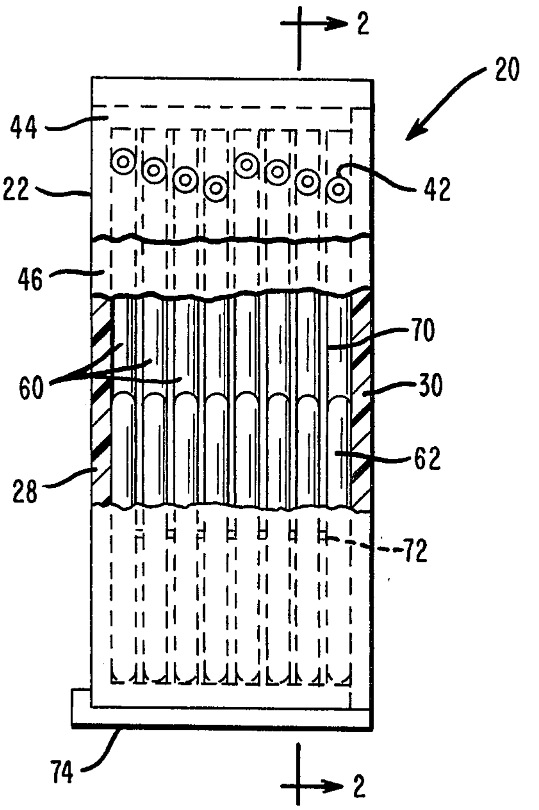
FIG. 1 is a frontal view, partially in section, of a printing system incorporating the subject matter of the present invention.
Figure 2:
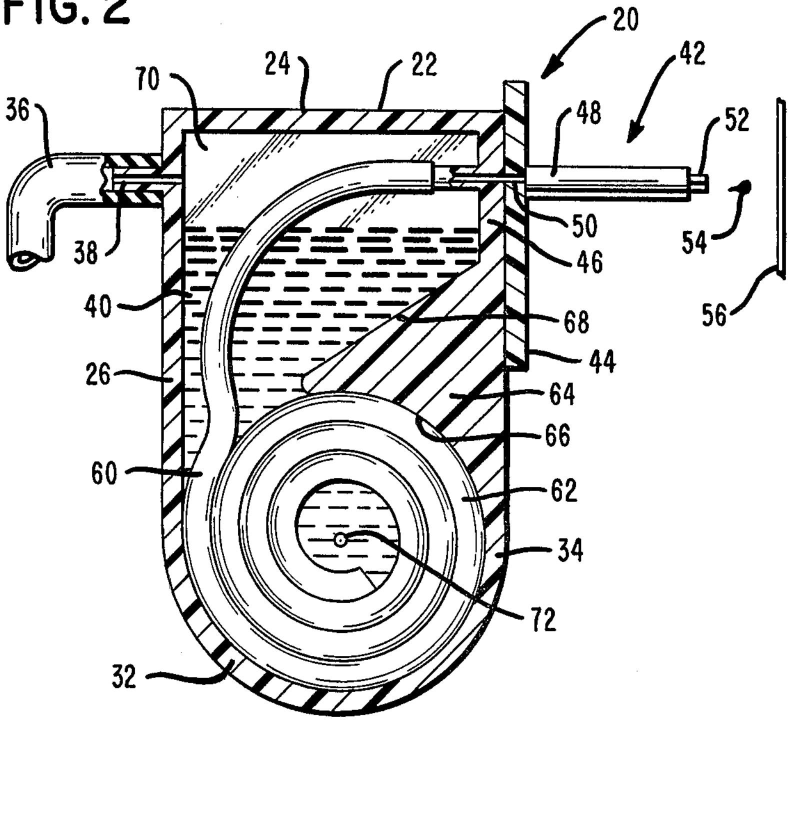
FIG. 2 is an elevational view taken along the line 2—2 of FIG. 1.

Referring now to the drawing, FIG. 1 illustrates an ink jet print head, generally designated as 20, and including several main elements or components making up the construction thereof. As seen also in FIG. 2, the general outline of the print head 20 is that of a reservoir 22 having a top cover 24, a rear wall portion 26, a left side wall portion 28, a right side wall portion 30, a bottom wall portion 32, and a front wall portion 34. The right side wall portion 30 is, in effect, a side cover plate which is removable and is of fluid tight construction when installed in suitable manner on the reservoir 22.

A supply tube 36 is suitably connected to an opening 38 in the rear wall portion 26 to enable ink fluid 40 to flow into the reservoir 22. The ink fluid 40 within the reservoir 22 may be maintained during printing operation between desired levels within an allowable range below the opening 38. Since the reservoir 22 is effectively sealed, the single supply tube 36 is sufficient to serve a number of printing elements operably associated with the reservoir. As the ink 40 is consumed by actuation of the printing elements, a negative pressure is generated in the reservoir 22 to draw ink through the tube 36 thereinto from an outside supply.

A plurality of ink jet printing elements 42 are supported from a circuit-connection member 44 suitably attached to an upper portion 46 of the front wall 34 of the reservoir 22. Each printing element 42, which may also be appropriately named a printing head or spritzer, includes a body portion 48 of cylindrical form having a glass tube or glass-lined passageway 50 through the body portion and terminating in a nozzle 52 for ejecting a droplet 54 of printing ink 40 to be applied to record media 56, which media may be in the form of paper or the like and supported in suitable manner around a drum or from a platen (not shown).

The printing element or head 42 may be of a type as disclosed in U.S. Pat. No. 3,832,579, appropriate for and commonly used in ink jet printing operations, and which includes a piezoelectric device or like tubular-type transducer for causing ejection of the ink droplets 54, either in synchronous or asynchronous manner, from the print head nozzle 52. The ink droplets 54, so produced from the nozzle 52, are essentially the same or constant in size and are normally ejected at a constant velocity.

The member 44 provides support and electrical connections to the printing elements 42 and is similar in construction to a printed circuit board. A teaching of such circuit board and printing element construction is disclosed in U.S. patent application No. 400,543 of S. P. Sayko, filed July 21, 1982, and assigned to the same assignee as the present invention.

A plurality of resilient conduits or tubes 60 are positioned within the reservoir 22 and are stacked as coiled elements in side-by-side manner in the lower portion thereof. The length of each tube 60 is effectively contained in a small volume and each tube absorbs pressure waves emitted by the associated pulsing transducer rather than reflecting such pressure waves back in the direction toward the nozzle. The tubes 60 are of relatively flexible-wall construction and formed into the coils 62 and such coils are positioned in a cavity formed by the lower rounded portion of the reservoir 22, illustrated as the bottom wall portion 32, and an interior portion 64. The interior portion 64 is formed as an integral part of the front wall portion 34 of the reservoir 22 and provides a rounded surface 66 and an inclined surface 68 joined to form a projection over the coils 62. The round or curved surface 66 is effective for containing the coiled tubes of ink and for restraining any movement of the tube coils 62 during printing operation. It is seen that the coils 62 are completely immersed in the ink fluid 40 and that only a small portion of the tube 60 is above the ink level. The effect of such immersion is that the ink 40 remains in an environment wherein the composition of the ink is substantially unchanged.

A baffle or like plate element 70 is placed between the coiled tubes 60 to create a series of narrow compartments for the printing elements 42. Such baffle arrangement may be constructed as disclosed in U.S. application No. 385,967 of J. E. Thomas, filed June 7, 1982, and assigned to the same assignee as the present invention. An opening 72 is provided in each baffle plate 70 near the center of the coils 62 of tubing to enable flow of the ink fluid 40 among the separate compartments. The baffles 70 also constrain excessive movement of the ink 40 into the narrow spaces as the print head 20 is moved in lateral direction by an appropriate carriage 74 (FIG. 1) during printing operation. The ink fluid 40 both within the coiled tubes 60 and within the reservoir 22 is, in effect, captured and allowed minimum movement during acceleration and deceleration of the reservoir during printing operation.

Certain parameters useful in the practice of the invention include the providing of a tube which is twenty centimeters in length and approximately 1.5 millimeters in diameter and which can be coiled to a diameter of about 2 centimeters. The tubing 60 utilized in the reservoir 22 may be made of Tygon (a polyvinyl chloride material manufactured by The Norton Chemical Company).

In operation, it is seen that during turnaround or reversal of the carriage 74 containing the reservoir 22 and the printing elements 42, a change in pressure Δh is experienced at the nozzle 52 in accordance with $$\Delta h = \tfrac{1}{2} a x$$

wherein a = turnaround acceleration x = distance of nozzle from center of reservoir From this equation it can be seen that, if a common reservoir 22 is used for several printing elements 42 whose nozzles 52 must be arranged substantially in a horizontal array, only one nozzle can be positioned precisely at the center of the reservoir. The other nozzles would be subjected to changes in pressure, ingestion of air and variation in ink droplet speed. However, it is seen that each printing element 42 is served by a respective ink supply tube 60 directly in line therewith so that the value of X is approximately equal to zero for each printing element, and that each ink supply tube is effectively isolated during the few milliseconds of time required for acceleration and deceleration of the print head 20.

It is thus seen that herein shown and described is a moving ink reservoir to which are attached a plurality of printing elements to make up a compact, multiple nozzle, print head. The stacked coils of tubing within the reservoir and the formation of a housing for the coils as a part of the reservoir and containing the tubes in the coiled arrangement provide for minimum movement of ink, damping of the ink, preventing diffusion of ink components, and constraining the print head parts within a compact space. The printing system provides for a controlled supply tube directly behind each ink jet nozzle and closely associated therewith for reducing pressure changes at the nozzle and for damping vibrations which may occur in the printer.

The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

I claim:

1. Means for limiting ink movement in an ink jet printing system comprising a single reservoir containing a supply of ink therein, a plurality of ink jet elements operably associated with and carried by the reservoir in printing operation, and a plurality of conduit means coiled within the reservoir and carrying ink therefrom to respective ink jet elements, said reservoir being formed around the conduit means for containment thereof in coiled manner whereby pressure waves within the ink carrying conduit means are absorbed during printing operation.

2. The subject matter of claim 1 wherein the conduit means comprise a plurality of coiled tubes contained in side-by-side manner by the formation of the reservoir.

3. The subject matter of claim 2 including means between the coils of tubes for maintaining the coils in side-by-side manner.

4. The subject matter of claim 1 including connection means on the reservoir for supporting the plurality of ink jet elements.

5. The subject matter of claim 2 wherein the reservoir includes an interior portion formed over the tubes for containment thereof in coiled manner.

6. The subject matter of claim 2 wherein the coiled tubes are submerged in the supply of ink and the reservoir includes a portion for containment therein.

7. Means for supplying ink to printing elements in an ink printing system comprising a single reservoir containing a supply of ink therein, and a plurality of coiled tubes within the reservoir and connected with respective printing elements, said tubes being arranged in side-by-side manner and said reservoir being formed to maintain the tubes in such manner during printing operation.

8. The subject matter of claim 7 wherein the tubes are resilient and are coiled adjacent each other in the reservoir.

9. The subject matter of claim 8 including means between adjacent coils of tubes for maintaining the side-by-side arrangement.

10. The subject matter of claim 7 including connection means on the reservoir for supporting the printing elements.

11. The subject matter of claim 8 wherein the reservoir includes an interior portion formed over the tubes for containment thereof in the coiled condition.

12. In an ink jet printer, a single reservoir containing a supply of ink, a plurality of printing elements operably associated with the supply of ink for ejecting ink in printing operations, and a plurality of coiled conduit means within the reservoir and connected with respective printing elements for supplying ink thereto, said reservoir being formed around the conduit means for containing thereof in precise position during printing operation.

13. In the printer of claim 12 wherein the conduit means comprise a plurality of resilient coiled tubes contained in side-by-side arrangement by the formation of the reservoir.

14. In the printer of claim 13 including means for maintaining the coils of tubes in side-by-side arrangement.

15. In the printer of claim 13 wherein the reservoir includes an interior portion formed over the tubes for constraining movement thereof during printing operation.

16. In the printer of claim 13 wherein the reservoir includes a cavity formed by a curved portion thereof for receiving the coiled tubes.

17. In the printer of claim 13 including means for causing the printing elements to be accelerated and decelerated in rapid transverse movement during printing operation.

18. In the printer of claim 13 wherein said reservoir includes a removable wall portion for enabling insertion of the coiled tubes in said side-by-side arrangement.

* * * * *